INVENTOR.
LOUIS H. LEONARD JR.
BY Herman Seid
ATTORNEY.

*INVENTOR.*
LOUIS H. LEONARD JR.
BY
*Herman Seid*
ATTORNEY.

INVENTOR.
LOUIS H. LEONARD JR.
BY Herman Seid
ATTORNEY.

3,019,613
ABSORPTION REFRIGERATION SYSTEMS AND
METHOD OF OPERATING THE SAME
Louis H. Leonard, Jr., Dewitt, N.Y., assignor to Carrier Corporation, Syracuse, N.Y., a corporation of Delaware
Filed Jan. 13, 1960, Ser. No. 2,208
24 Claims. (Cl. 62—103)

This invention relates to absorption refrigeration systems and to a control arrangement therefor and, more particularly, to an absorption refrigeration system employing a saline solution as an absorbent, and a medium miscible therewith as a refrigerant, and to a method of operating the same.

In the copending application of Louis H. Leonard, Jr., Serial No. 2,203, filed January 13, 1960, entitled Absorption Refrigeration Systems and Method of Operating the Same, there is disclosed an absorption refrigeration system including a control arrangement adapted, upon partial load imposed on the system, to precipitate salt from solution in the generator thereby decreasing the capacity of the system, the control arrangement upon an increase in load imposed upon the system permitting solution in the generator to absorb the precipitated salt thereby increasing the capacity of the system. The present invention is concerned with an improved control arrangement for an absorption refrigeration system of the type disclosed in such application.

The chief object of the present invention is to provide an absorption refrigeration system and an improved control arrangement therefor.

An object of the invention is to provide a control arrangement for an absorption refrigeration system which includes means for automatically selecting the places of discharge of weak solution in the generator to regulate the quantity of weak solution passing in heat exchange relation with the heating medium in the generator.

A further object is to provide a method of operation of an absorption refrigeration system which permits accurate control of the system throughout its operating range. Other objects of the invention will be readily perceived by reference to the following description.

The term "weak solution" is used herein to describe a solution weak in absorbing power. The term "strong solution" is used herein to define a solution strong in absorbing power.

The preferred absorbing solution is a solution of lithium bromide in water. A preferred refrigerant is water. Concentration of solution leaving the generator may vary, but, preferably, is about 66% during full load operation of the system.

This invention relates to a control arrangement for absorption refrigeration system including an absorber, an evaporator, a generator and a condenser, the absorber communicating with the generator to permit the passage of weak solution to the generator, the generator communicating with the absorber to permit the passage of strong solution to the absorber, solution discharge means in the generator adapted to discharge solution therein and means for varying the effective flow path of solution discharged in the generator in heat exchange relation with heating medium in the generator.

This invention further relates to a method of operation of an absorption refrigeration system including a generator containing a tube bundle compartment and an outlet compartment, solution discharge means in the tube bundle compartment for discharging weak solution in heat exchange relation with heating medium in the tube bundle in which the steps consist in discharging solution in the generator at full load in heat exchange relation with the heating medium in the tube bundle and, at partial load, varying the effective flow path of the solution discharged in the generator in heat exchange relation with the heating medium in the generator.

The attached drawings illustrate preferred embodiments of the invention, in which.

Figure 1:
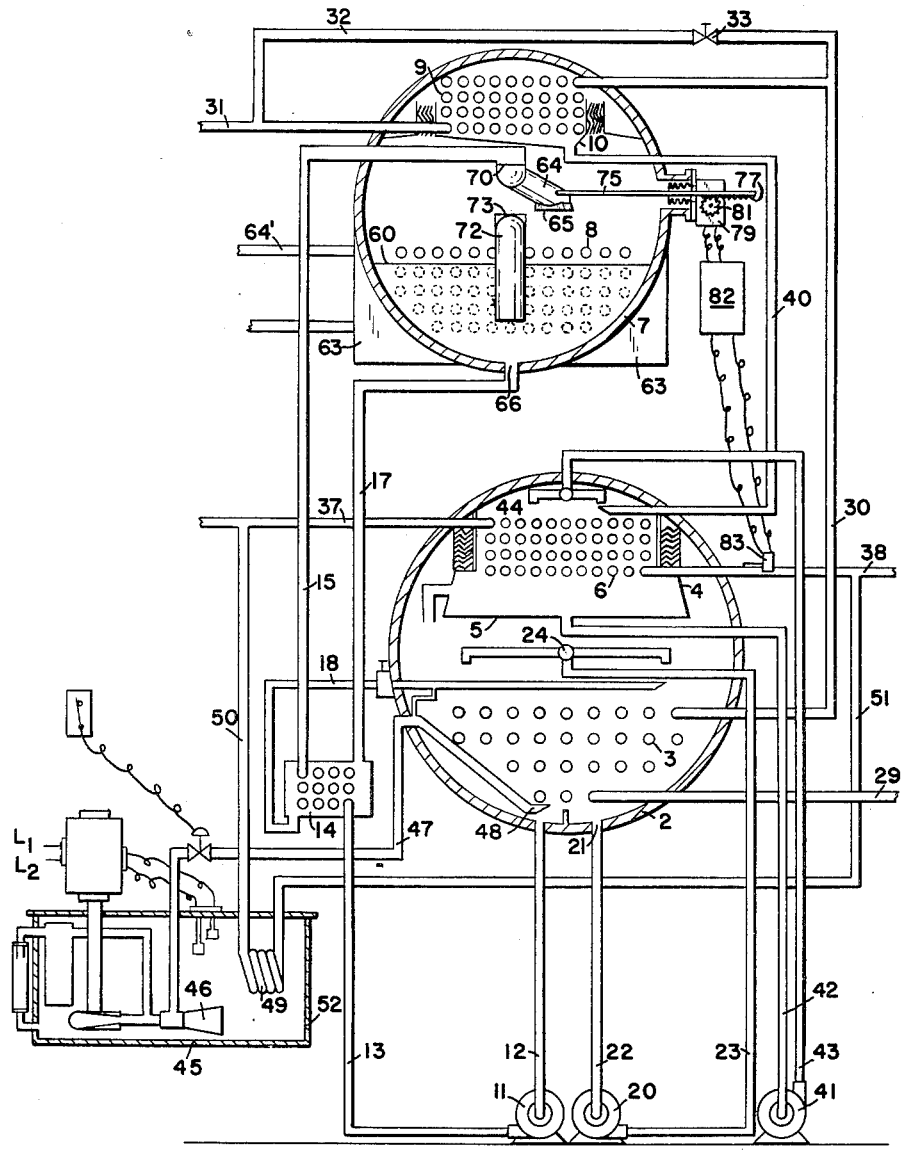
FIGURE 1 is a diagrammatic view illustrating an absorption refrigeration system provided with the control arrangement of the present invention.

Referring to the attached drawings, there is illustrated diagrammatically in FIGURE 1 an absorption refrigeration system embodying the control arrangement of the present invention. The system comprises a shell 2 containing a plurality of tubes 3 which cooperate with the shell to form an absorber. Placed in shell 2 above the absorber is a pan-like member 4 which cooperates with shell 2 to form an evaporator 5. The evaporator 5 includes a plurality of tubes 6 extending longitudinally of the shell above pan 4; medium to be cooled passes through these tubes in heat exchange relation with liquid refrigerant sprayed thereover.

A second shell 7, preferably, is placed above the first shell. A plurality of U-shaped tubes 8 extend in the lower portion of shell 7 and cooperate with shell 7 to form a generator. A weir member 60 extends across the lower portion of shell 7 and separates the generator into a tube compartment 61 and an outlet compartment 62; weir 60 extends upwardly to a height approximately equal to the second row of tubes 8 therein, counting downward. A compartment at the steam chest 63 is provided at one end of the generator and provides steam or other medium to the interior of tubes 8, the condensate leaving the tubes through an outlet in chest 63.

A plurality of tubes 9 are placed in the upper portion of shell 7 to form a condenser. The tubes 9 cooperate with a pan-like member 10 to form the condenser.

Pump 11 withdraws weak solution from absorber 3 through line 12. Pump 11 forwards weak solution through line 13 to heat exchanger 14 in which the weak solution is placed in heat exchange relation with strong solution returning from the generator, as hereinafter described. The weak solution is then forwarded from the heat exchanger 14 through line 15 to generator 8 being discharged therein through discharge member 64 having an open end 65. Solution in the generator discharged at one end thereof flows through compartment 61 in heat exchange relation with heating medium in the tubes 8, overflows weir 60 into compartment 62 and leaves the generator through outlet 66.

Strong solution flows from outlet 66 of generator 8 through line 17, heat exchanger 14 and line 18 to the absorber, preferably, being discharged therein adjacent one end of shell 2; that is, strong solution flows through forces of gravity from the generator to the absorber. It will be understood, of course, if desired, the strong solution may be discharged in the absorber over the tubes therein.

Pump 20 serves as an absorber pump and is employed to withdraw solution of intermediate concentration from absorber 3 through outlet 21 and line 22. Pump 20 forwards the solution of intermediate concentration through line 23 to the spray arrangement 24 of the absorber.

Spray arrangement 24 serves to distribute the recirculated solution over the tubes throughout the length of absorber 3. It will be understood the strong solution mixes to some extent with solution in the absorber and that complete mixing occurs as the pump 20 forwards the mixed solution so that a solution having a concentration intermediate the concentration of the strong and weak solutions is circulated. Reference is made to United States Patent No. 2,840,997, granted July 1, 1958, for a more detailed description of the flow of solution in the system.

Condensing water is forwarded by a pump (not shown) through line 29 to the tubes 3 of the absorber. The condensing water passes from the tubes 3 of the absorber through line 30 to the tubes 9 of the condenser. Condensing water leaves the tubes 9 of the condenser through line 31. A bypass line 32 is provided about the tubes 9 of the condenser extending from line 30 to line 31. A manual valve 33 is placed in bypass line 32. This bypass permits flow of condensing water through the tubes of the condenser to be adjusted at full load when a system is installed. Thereafter, no adjustment of the flow of condensing water through the tubes of the condenser is required.

Steam is supplied to the tubes 8 of the generator through steam chest 63. If desired, a suitable pressure regulating valve (not shown) may be placed in a line 64' supplying steam chest 63 to assure desired steam pressure in the generator. Ordinarily, however, the system of the present invention employs steam at twelve pounds pressure and steam at such pressure is ordinarily supplied from the usual boilers employed in the industry. Steam condensate leaves the tubes of generator 8 through a section of chest 63.

Medium to be cooled is forwarded by a pump (not shown) through a line 37 to the tubes 6 of the evaporator. The cooled medium leaves the tubes 6 through line 38 and is forwarded to a place of use such as the central station of an air conditioning system. The medium, after passing through the central station, returns to the evaporator 4 through line 37 to be again cooled and reused.

Condensate leaves pan 10 of the condenser through line 40 and is returned to the evaporator and discharged therein over the tubes 6 to wet the tubes. It will be appreciated the refrigerant is flashed or vaporized by the heat exchange relation with medium passing through the tubes. Flashed vapor passes to the absorber to be absorbed by solution therein.

Pump 41 serves to recirculate liquid refrigerant collected in the evaporator about the evaporator. Pump 41 is connected to the evaporator by line 42 to withdraw liquid refrigerant therefrom. Pump 41 forwards the liquid refrigerant through line 43 to spray arrangement 44 of the evaporator, the liquid refrigerant flash-cooling upon discharge in the evaporator, remaining liquid refrigerant wetting the tubes to cool medium passing through the tubes. The heat exchange relation between medium passing through the tubes and the liquid refrigerant on the exterior of the tubes evaporates liquid refrigerant, the vapor passing to the absorber as previously described.

A suitable purge arrangement 45 is provided to remove non-condensible gases from the absorber. The ejector 46 of purge arrangement 45 is connected by line 47 to a purge line 48 extending longitudinally of the absorber. The cooling coil 49 of purge arrangement 45 is connected to line 37 by line 50 and to line 38 by line 51, permitting the medium to be employed for cooling solution in the purge tank 52. Purge arrangement 45 is disclosed and claimed in the application, Serial No. 565,324, filed February 14, 1956, now Patent No. 2,940,273, and reference is made to such application for a more complete description of the purging arrangement.

Figure 2:
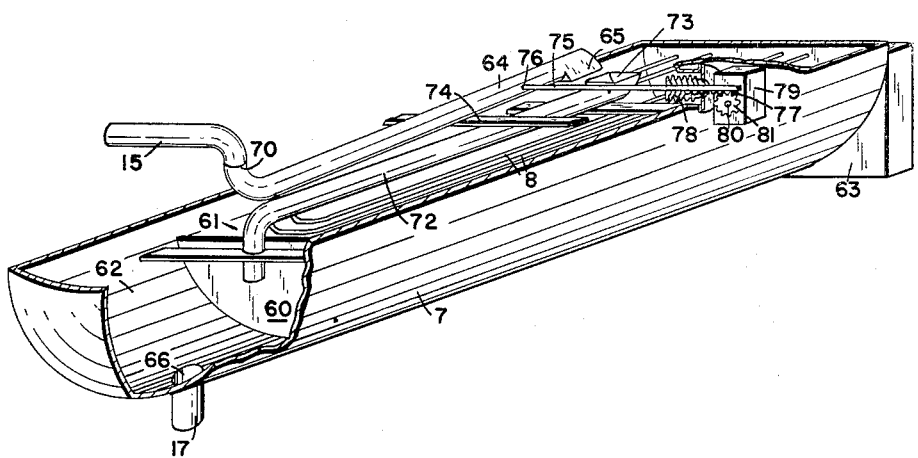
FIGURE 2 is a perspective view of the generator of the absorption refrigeration system partially broken away to illustrate the control arrangement.

Considering the control arrangement shown in FIGURE 2, a discharge member in the form of a tube 64 is adjustably connected at point 70 to weak solution line 15. Tube 64 extends longitudinally of the generator over the tube bundle and is adapted to discharge adjacent one end of the generator. Tube 64 terminates in a downwardly extending portion having an open end 65, the walls of the opening therein having the form of a parallelogram.

A tube 72 is supported in the generator and extends from the outlet compartment 62 over weir 60 and through tube compartment 61 to a point adjacent tube 64. Tube 72 terminates in an upwardly extending end portion having an opening 73 therein, the walls of the opening 73 also having the form of a parallelogram, the square matching ends 65 and 73 of tubes 64 and 72 result in excellent throttling characteristics. The diverting pipe 64 with its square end 65 acts in effect as a modulating valve since the square matching ends of tubes 64, 72 permit flow of solution in heat exchange relation with the heating medium to be proportioned as desired.

As stated above, tube 72 is fixed in position in the generator. Tube 64 is pivotally mounted as shown at point 70 to weak solution line 15 so that it is rotatable in a horizontal plane. Suitable braces 74 may be placed beneath the tube, if desired, to provide additional support therefor. A bar member 75 is attached to tube 64 at point 76, the other end of bar 75 having a rack 77 attached thereto. Bar 75 passes through shell 7, the opening therein being sealed by bellows 78. A reversible motor 79 is placed exteriorly of shell 7, its shaft 80 carrying a spur gear 81 adapted to engage rack 77. Motor 79 preferably is actuated by means of electronic control 82 including an amplifier and a relay (not shown) designed to change a temperature indication reflected by thermostat 83 placed in chilled water line 38 into an electrical signal to actuate motor 79 in response to the temperature of chilled water leaving the evaporator. Motor 79 is thus actuated by control 82, in turn actuated by thermostat 83, to shift the position of tube 64 selecting the places of discharge of solution in the generator; in other words, tube 64 discharges some portion of solution into tube 72, the solution passing through tube 72 to the outlet compartment 62. For example, at full load, tube 64 discharges weak solution at one end of the generator, the solution flowing longitudinally through the generator in heat exchange relation with heating medium in tubes 8. However, as load decreases, the position of tube 64 is shifted so that some portion of the discharged solution is discharged into tube 72, such solution passing through tube 72 and being discharged in outlet compartment 62. As the load continues to decrease, tube 64 is shifted until the openings 65, 73 match so that all solution is discharged in tube 72 and flows through tube 72 to the outlet compartment 62, completely bypassing the heating medium in tubes 8.

While I have described the control arrangement as electronic, it will be appreciated that any suitable electronic or pneumatic controls may be provided since the specific construction of the control is not a part of the present invention, suitable controls being readily available on the open market.

It will be understood that under full load conditions, all weak solution passes through line 15 and tube 64 and is discharged in the generator adjacent one end thereof. However, as the load imposed on the system decreases, as reflected by the temperature of chilled water leaving the evaporator, the position of tube 64 is shifted to divert and discharge a portion of the solution into tube 72, such solution flowing through tube 72 to outlet compartment 62, thus reducing the quantity of solution passing through the generator in heat exchange relation with heating medium in tubes 8. So diverting weak solution, varies the concentration of solution supplied to the absorber in accordance with cooling medium requirements. Generally speaking, while the quantity of solution forwarded to the absorber for reconcentration is substantially constant, such solution is in effect bypassed about tubes 8 as required to keep the absorber solution at the desired concentration to meet load requirements.

Considering the operation of the absorption refrigeration system, it will be appreciated that the machine is designed to operate at a desired steam pressure, for example, twelve pounds because most existing steam boilers are designed to provide steam at such pressure. It will be appreciated other pressures may, of course, be used and in such case a pressure regulating valve may be placed in the steam line to assure that steam at the desired pressure is provided to the generator. I have described too a bypass about the tubes of the condenser for condensing water,. It will be appreciated that in many cases such bypass is not necessary, but that it is desirable in order to adjust the machine to operation at full load conditions. After the machine is adjusted to operation at full load conditions, the condenser bypass need not be actuated for further operation. If desired, of course, for this purpose, steam pressure may be varied.

Considering operation of the absorption refrigeration system, it will be appreciated that at start-up the generator contains a large amount of precipitated or crystallized lithium bromide salt. In some cases, it appears as if the generator tubes were covered with a pile of white snow. It will be appreciated there is no need for manual or automatic steam valves to be closed during the shutdown period since the low thermal conductivity of the solid salt serves as an excellent insulator to shield the generator from the hot steam in the tubes. Under such conditions, the salt will dissolve at least partially during shutdown if the valve is closed which is desirable. The solution in the remainder of the system including the heat exchanger is under extremely dilute conditions.

When the system is placed in operation, medium to be cooled is forwarded through line 37 to the tubes 6 of evaporator 4 and leaves the tubes 6 of evaporator 4 through line 38. At start-up, the pumps are actuated, pump 11 withdrawing weak solution from the absorber through line 12 and forwarding the weak solution through line 13, heat exchanger 14 and line 15 to generator 8, being discharged therein through tube 64 at one end of the generator and flowing through the length of the generator in heat exchange relation with the heating medium in the tubes 8, overflowing weir 60 into compartment 62 and leaving the generator through outlet 66.

In the generator, the solution flows over the top of the salt pile gradually dissolving the solid salt and returning the concentrated solution to the absorber where it can immediately go to work to produce useful refrigeration. It will be appreciated that instead of needing to wait for the overall solution concentration in the machine to build up, the latent capacity of the stored solid salt in the generator is instantly ready to go to work. This is virtually impossible with any other type of control arrangement.

Refrigerant vapor is boiled from the solution in the generator 8, vapor passing to condenser 9 and being condensed therein, the condensate returning to the evaporator through line 40.

Strong solution leaves the generator through outlet 66, line 17, heat exchanger 14, line 18 and is discharged, preferably, over an end of the absorber tube bundle. Strong solution is flash-cooled to some slight extent as it is discharged in the absorber. The discharged strong solution mixes with solution in the absorber and is withdrawn from the absorber through outlet 21 and line 22 by pump 20, solution of intermediate concentration so formed being returned to the absorber through line 23 and being sprayed over the tube bundle by spray arrangement 24. It will be appreciated that the mixture of strong solution and solution in the absorber forming the solution of intermediate concentration is further mixed and cooled in passage through the refrigeration system.

Pump 41 serves to withdraw liquid refrigerant from the pan 5 of evaporator 4, and to recirculate the liquid refrigerant through lines 42 and 43 to the discharge means 44 of the evaporator. The discharge means 44 sprays the liquid refrigerant over the tubes 6 of evaporator 4. The tubes are wetted by the liquid refrigerant, the wetted refrigerant being vaporized by the heat exchange relation with medium passing through the tubes. Vapor so formed passes outwardly through the eliminators and flows downward to the absorber 3 being absorbed by solution therein.

Vapor condensate is returned from condenser 9 through line 40 to the evaporator being flash-cooled upon discharge therein over tubes 6. Thus, the vapor condensate aids in wetting the tubes to cool the medium passing therethrough.

Now, considering operation at full load conditions, the cooled medium rapidly cools down to design conditions. All solution supplied to the generator is discharged through tube 64 at one end of the generator to permit the full volume of weak solution to pass through the generator in heat exchange relation with heating medium thereby dissolving the solid salt encrusted on the tubes and insuring that all salt present in the system is in solution.

Assuming the system goes into operation at partial load as indicated by decrease in the temperature of cooling medium leaving the evaporator, reflected by the thermostat 83, control 82 actuates motor 79 to rotate tube 64 in a horizontal plane, thereby shifting the position of tube 64 so that some portion of solution is discharged into tube 72, flowing therethrough and being discharged in compartment 62; such solution, in effect, bypasses the heating medium in the generator. As the weak solution flow to the generator is bypassed by a greater quantity being discharged in tube 72 and flowing therethrough to outlet compartment 62, the solution concentration in the generator adjacent tubes 8 gradually changes, at approximately 50% load approaching the consistency of thick syrup. At approximately 25% load, it appears to be a thick slush. Even though the solution in the generator adjacent tubes 8 begins to increase in concentration as soon as the system begins to operate on partial load, the solution leaving the generator is diluted to more than a safe concentration before it reaches the heat exchanger by the addition of bypassed weak solution thereto thus preventing precipitation or crystallization in the heat exchanger.

At zero load, substantially all solution supplied to the generator is discharged by tube 64 into tube 72 and flows therethrough to the outlet compartment 62 so that the solution bypasses tubes 8 permitting salt to precipitate thereon, for weir 60 prevents solution in compartment 61 overflowing to outlet compartment 62 with the result that refrigerant in solution in compartment 61 is boiled off so that precipitated salt collects adjacent tubes 8. In one sense, the present arrangement may be considered as the circulation of the solution at zero load with the addition of solid salt or slush thereto as required to provide a solution of higher concentration as the load imposed upon the system increases, that is, to maintain a desired concentration in accordance with the load imposed on the system.

It will be appreciated that precipitation of the salt in the generator does not interfere with system operation. Even though lumps of solid salt may be carried from the generator, they are immediately dissolved and diluted by the weak solution before they reach the heat exchanger.

Figure 3:
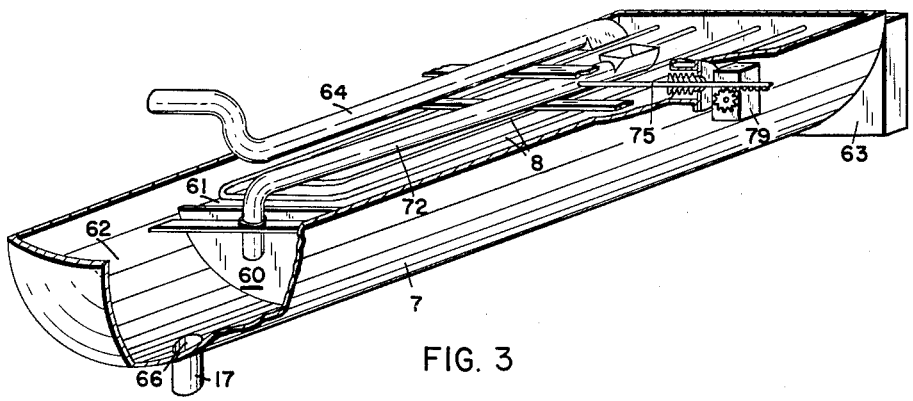
FIGURE 3 is a perspective view similar to FIGURE 2 illustrating a modified control arrangement.

In FIGURE 3, I have illustrated a modification of the control arrangement shown in FIGURES 1 and 2. As shown in FIGURE 3, tube 64 is fixed in position, tube 72 being rotatably mounted; the actuating means are attached to tube 72. When it is desired to bypass the solution, the position of tube 72 is shifted during partial load operation to permit more or less weak solution to bypass the heating medium in the generator.

Figure 4:
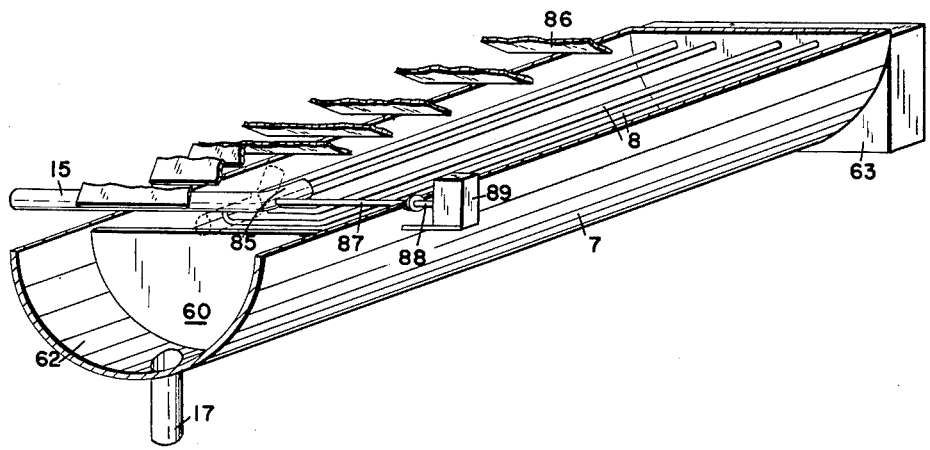
FIGURE 4 is a perspective view of the generator of the absorption refrigeration system partially broken away to illustrate another form of the control arrangement.

In FIGURE 4, I have illustrated a modified form of control arrangement. In this control arrangement, a diverting pipe 85 is rotatably attached to weak solution line 15, a short distance above one end of tube bundle 8. It will be observed that diverting member 85 is rotatable in a vertical plane. When nozzle member 85 is rotated in a counterclockwise direction it varies the length of discharge of solution therefrom. At full load, of course, the nozzle member 85 is so positioned that solution is discharged or sprayed the length of the tube bundle. However, as load imposed upon the system decreases the nozzle member is rotated in a counterclockwise direction thereby decreasing the length of the discharge jet. Preferably, impingement plates 86 are provided to assure that solution spray does not reach the condenser. Plates 86 are so spaced, however, so that vapor boiled off in the generator is free to flow to the condenser. The impingement plates help distribute the solution in the generator. As the load is decreased, solution is introduced closer to the overflow weir, preventing unnecessary dilution of the crystallized salt.

A rod member 87 is connected to the shaft 88 of motor 89, motor 89 being actuated by an electronic control (not shown), as described in connection with FIGURE 2.

Figure 5:
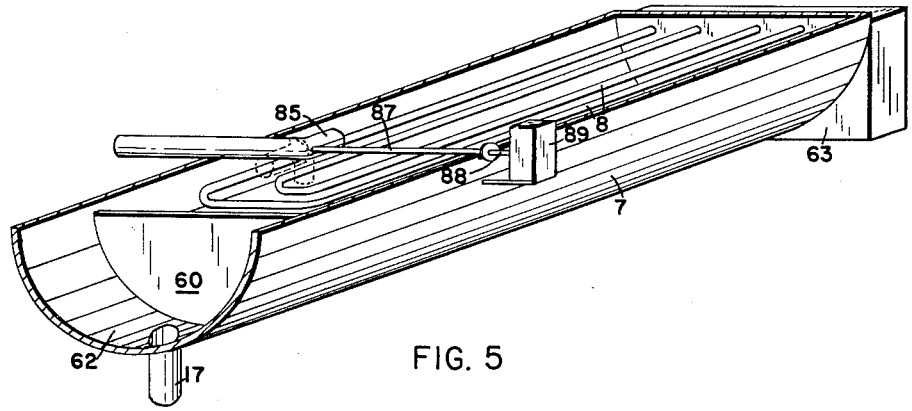
FIGURE 5 is a perspective view similar to FIGURE 4 illustrating a different position of the control arrangement.

In FIGURE 5 there is shown a modified embodiment of the control arrangement illustrated in FIGURE 4. In this case, nozzle member 85 is placed some distance above the tube bundle to spray discharge solution the length of the tube bundle. The nozzle member 85 may be rotated in a clockwise direction, thus decreasing the length of discharge of solution as load imposed upon the system decreases.

The present invention provides a simple economical control arrangement for an absorption refrigeration system permitting full range operation of the absorption refrigeration system. The control arrangement is provided as an internal part of the system requiring no field application engineering, installation or the like. The control arrangement is factory engineered, factory installed and factory tested before use.

The control arrangement permits a large decrease in consumption of steam at partial load operations of the absorption refrigeration system. Similarly by the use of the control arrangement of the present invention, condensing temperatures in the condenser during partial load operations are the lowest possible temperatures which can be obtained, thus greatly reducing tendencies to scaling of the condenser tubes.

While I have described preferred embodiments of the invention, it will be appreciated the invention is not so limited since it may be otherwise embodied within the scope of the following claims.

I claim:

1. In a control arrangement for an absorption refrigeration system including an absorber, an evaporator, a generator and a condenser, the absorber communicating with the generator to permit the passage of weak solution to the generator, the generator communicating with the absorber to permit the passage of strong solution to the absorber, the combination of solution discharge means in the generator adapted to discharge solution at a plurality of selected places in the generator, and means for automatically selecting the place or places of discharge of solution in the generator in response to load imposed upon the system.

2. In a control arrangement for an absorption refrigeration system including an absorber, an evaporator, a generator and a condenser, the absorber communicating with the generator to permit the passage of weak solution to the generator, the generator communicating with the absorber to permit the passage of strong solution to the absorber, the combination of solution discharge means in the generator adapted to discharge solution at a plurality of selected places in the generator, and means for automatically selecting the place or places of discharge of solution in the generator and the quantities of solution discharged at said places in response to load imposed upon the system.

3. In combination with an absorption refrigeration system including a generator having a weir member therein separating the generator into a first compartment and a second compartment, a tube bundle placed in the first compartment, and an outlet for strong solution placed in the second compartment, means for discharging weak solution in the generator in heat exchange relation with heating medium passing through the tube bundle therein, and means for automatically selecting the place or places of discharge of solution in the generator in response to load imposed upon the system.

4. A control arrangement for an absorption refrigeration system according to claim 3 in which said selective means is actuated in response to the temperature of chilled water leaving the evaporator.

5. In a control arrangement for an absorption refrigeration system including an absorber, an evaporator, a generator and a condenser, the absorber communicating with the generator to permit passage of weak solution to the generator, the generator communicating with the absorber to permit passage of strong solution to the absorber, the combination of rotatably mounted solution discharge means to supply weak solution in the generator in a predetermined path in heat exchange relation with the heating medium passing through tubes therein, rotation of said means varying the effective flow path of the solution discharged in the generator in heat exchange relation with the heating medium therein.

6. A control arrangement for an absorption refrigeration system according to claim 5 in which the rotatably mounted solution discharge means is rotatable in a vertical plane.

7. A control arrangement for an absorption refrigeration system according to claim 6 including means for rotating the discharge means in response to variation in load imposed upon the system.

8. A control arrangement for an absorption refrigeration system according to claim 7 in which the rotating means is actuated in response to the temperature of chilled water leaving the evaporator.

9. In combination with an absorption refrigeration system including a generator having a weir member therein separating the generator into a first compartment and a second compartment, a tube bundle placed in the first compartment, and an outlet for strong solution placed in the second compartment, rotatably mounted solution discharge means for discharging weak solution in the generator in a predetermined path in heat exchange relation with the heating medium passing through the tube bundle therein, rotation of said means varying the effective flow path of solution discharged in the generator in heat exchange relation with heating medium therein.

10. An absorption refrigeration system according to claim 9, in which means are provided to rotate the discharge means in response to variation in load imposed upon the system.

11. An absorption refrigeration system according to claim 10 in which said means are actuated in response to the temperature of chilled water leaving the evaporator.

12. An absorption refrigeration system according to claim 11 in which the actuating means includes a shaft member attached to the discharge means, a reversible motor having a shaft connected to said first shaft whereby rotation of said motor imparts rotary motion in a substantially vertical plane to the discharge means.

13. In the method of operation of an absorption refrigeration system including a generator containing a first compartment, a tube bundle in the first compartment, an outlet compartment, solution discharge means in the first compartment for discharging weak solution in heat exchange relation with heating medium in the tube bundle, the steps which consist in discharging solution in the generator at full load in a predetermined path in heat exchange relation with heating medium in the tube bundle, and, at partial load, rotating the discharge means to vary the effective flow path of solution discharged in the generator in heat exchange relation with heating medium therein.

14. In a control arrangement for an absorption refrigeration system including an absorber, an evaporator, a generator and a condenser, the absorber, communicating with the generator to permit the passage of weak solution to the generator, the generator communicating with the absorber to permit the passage of strong solution to the absorber, the combination of discharge means to supply weak solution in the generator in heat exchange relation with heating medium therein, and means in said generator cooperating with the discharge means to vary the quantity of weak solution discharged in the generator in heat exchange relation with the heating medium.

15. A control arrangement according to claim 14 in which means are provided to actuate said varying means in response to variation in load imposed upon the system.

16. In combination with an absorption refrigeration system including a generator having a weir member therein separating the generator in a first compartment and a second compartment, a tube bundle placed in the first compartment and an outlet for strong solution placed in the second compartment, means for discharging weak solution in the generator in heat exchange relation with heating medium passing through the tube bundle therein, a member extending from a position adjacent the discharge means through the first compartment and into the second compartment to receive solution from the discharge means, and means for varying the relationship between said member and said discharge means to vary the quantity of solution discharged in the generator in heat exchange relation with heating medium.

17. An absorption refrigeration system according to claim 16 in which the member comprises a tube extending from the outlet compartment to a point in the first compartment adjacent the discharge means, said tube terminating in the first compartment in an upwardly extending portion having an inlet therein, the walls of the inlet having the form of a parallelogram.

18. An absorption refrigeration system according to claim 17 in which the discharge means comprises a tube extending downwardly in the first compartment having an outlet therein, the walls of the outlet having the form of a parallelogram.

19. An absorption refrigeration system according to claim 18 in which means are provided to actuate said varying means in response to variation in load imposed upon the system.

20. An absorption refrigeration system according to claim 19 in which said means is responsive to the temperature of chilled water leaving the evaporator.

21. An absorption refrigeration system according to claim 20 in which said varying means include a rod member attached at one end to the discharge tube, a rack on the opposite end of the rod member, a reversible motor having a shaft, and a spur gear on said shaft adapted to engage the rack to impart rotary motion in a substantially horizontal plane to the discharge tube about its point of attachment to the weak solution line.

22. An absorption refrigeration system according to claim 20 in which said varying means include a rod member attached at one end to the tube extending in said compartments, a rack on the opposite end of the rod member, a reversible motor having a shaft, and a spur gear on said shaft adapted to engage the rack to impart rotary motion in a substantially horizontal plane to said tube.

23. In the method of operation of an absorption refrigeration system including a generator containing a tube bundle compartment and an outlet compartment, solution discharge means in the tube bundle compartment for discharging weak solution in heat exchange relation with heating medium in the tube bundle and second means in the generator adjacent the discharge means extending into the outlet compartment, the steps which consist in discharging solution in the generator at full load in heat exchange relation with heating medium in the tube bundle, and, at partial load, varying the relationship between the discharge means and said second means to forward at least some solution to the outlet compartment without passage in heat exchange relation with the heating medium.

24. In the method of operation of an absorption refrigeration system including a generator containing a tube bundle compartment and an outlet compartment, solution discharge means in the tube bundle compartment for discharging weak solution in heat exchange relation with heating medium in the tube bundle, and a tube member adjacent the discharge means extending into the outlet compartment, the steps which consist in discharging solution in the generator at full load in heat exchange relation with heating medium in the tube bundle, and, at partial load, rotating the discharge means in a substantially horizontal plane to direct at least some portion of the discharged solution through the tube member to the outlet compartment without passage in heat exchange relation with the heating medium.

References Cited in the file of this patent

UNITED STATES PATENTS

| | | |
|---|---|---|
| Re. 22,043 | Nelson | Mar. 3, 1942 |
| 2,129,502 | McCreary | Sept. 6, 1938 |
| 2,550,429 | Reid | Apr. 24, 1951 |
| 2,679,733 | Ashley | June 1, 1954 |
| 2,715,610 | Thompson | Aug. 16, 1955 |